UNITED STATES PATENT OFFICE.

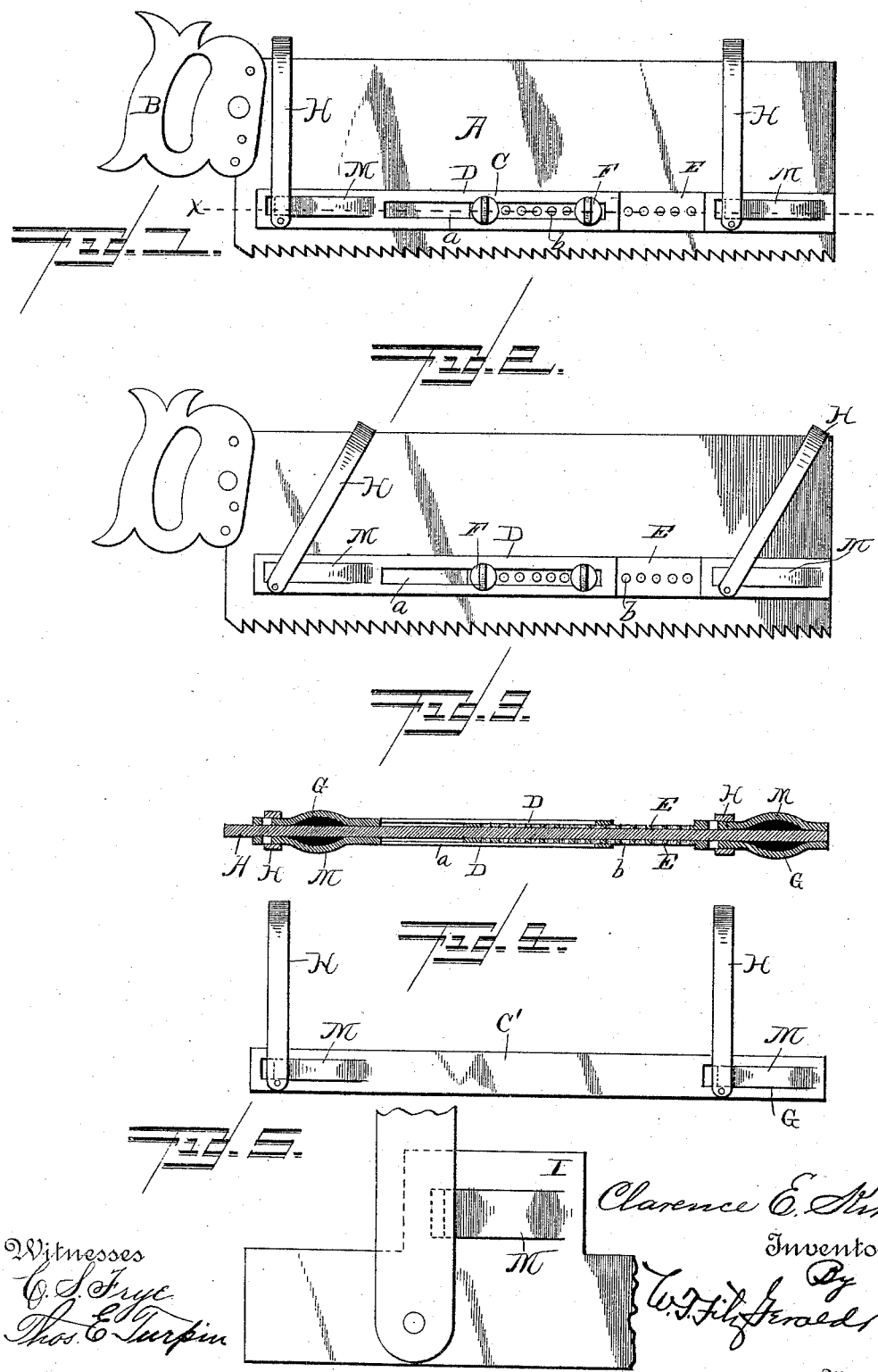

CLARENCE ELIAS KING, OF WASHINGTON, DISTRICT OF COLUMBIA.

SAW-GAGE.

SPECIFICATION forming part of Letters Patent No. 489,817, dated January 10, 1893.

Application filed February 8, 1892. Serial No. 420,640. (No model.)

*To all whom it may concern:*

Be it known that I, CLARENCE ELIAS KING, a citizen of the United States, residing at Washington, in the District of Columbia, have invented certain new and useful Improvements in Saw-Gages; and I do hereby declare the following to be a full, clear, and exact description of the invention, such as will enable others skilled in the art to which it appertains to make and use the same.

My invention has relation to improvements in saw gages, and it is designed more particularly as an improvement upon the construction of gage disclosed in my Letters Patent, dated January 12, 1892, and numbered 467,010.

The general object of my present invention is to provide a gage of a construction adapted, when mounted upon a saw blade, to be adjusted so as to yieldingly or positively engage the sides of the said blade.

Other objects and advantages will be fully understood from the following description and claims when taken in conjunction with the accompanying drawings, in which:—

Figure 1 is a side elevation of my improved gage in position upon a saw blade; the clamping loops being so adjusted that the gage bars will be yieldingly pressed against the blade. Fig. 2 is a similar view showing the clamping loops so adjusted that the gage bars will be positively pressed and held against the blade. Fig. 3 is a longitudinal, transverse section taken in the plane indicated by the line *x—x* on Fig. 1. Fig. 4 is a side elevation disclosing a modified construction of gage embodying non-extensible gage bars and Fig. 5 is a detail side elevation of a portion of a modified gage bar and clamping loop.

Referring by letters to the said drawings:—

A, indicates the blade of the saw, and B, indicates the handle thereof, both of which may be of the ordinary or any approved form and construction.

C, indicates the extensible gage bar of my improved gage which respectively comprise the sections D, and E, and are designed to rest upon opposite sides of a saw blade, for a purpose presently set forth. Formed in the section D, of the gage bars as shown, is a longitudinal, transversely-disposed slot *a*, for the passage of the shanks of the set screws F, which are designed to take into the threaded apertures *b*, of the section E, to adjustably fix the sections with respect to each other.

Preferably struck up from the gage bar sections D, and E, are the preferably bowed shoes M, upon the inside of each of which is arranged a block of rubber or resilient substance G, which is designed for a purpose presently described.

Pivotally or flexibly connected at their ends to the sections D, and E, of the gage bars beneath the horizontal plane of the shoes M, and straddling the saw blade, are the clamping loops H, which are preferably formed from spring metal and preferably have their middles bowed so as to increase their resiliency and adapt them to yieldingly press the gage bars against the saw blade, as shown in Fig. 1 of the drawings. In addition to yieldingly pressing the gage bars against the saw blade, the clamping loops H, serve to positively bind said bars upon the blade as follows:—When it is desired to positively bind the gage bars upon the blade, the bars are first adjusted to position, and the clamping loops are swung into engagement with the shoes M, when they will ride up the curved or inclined surface of said shoes and will press the same inwardly and cause the resilient blocks G, to positively bind upon the blade and securely hold the gage in its adjusted position.

When it is desired to yieldingly press or bind the gage bars against the saw blades, the resilient strength of the clamping loops is alone depended upon, as shown in Fig. 1.

In Fig. 4 of the drawings I have illustrated a gage embodying a non-extensible gage bar C′, which is provided with shoes M, and resilient blocks G, as shown, which are designed to be engaged by the clamping loops H, for the purpose before described.

In Fig. 5 of the drawings I have illustrated a gage bar provided with a lateral branch I, from which is preferably struck up a shoe M, which is preferably of the same form and is designed for the same purpose as those disclosed in Figs. 1 to 4, inclusive.

From the foregoing description and the accompanying drawings, it will be readily perceived that I have provided a highly advantageous gage of a cheap and simple construction and one adapted to be quickly and easily applied to and removed from a saw blade without in any manner damaging the same.

Although I have specifically described the construction and relative arrangement of the several elements of my improved saw gage, yet I do not desire to be confined to the same, as such changes or modifications may be made as fairly fall within the scope of my invention.

Having thus described my invention, what I claim and desire to secure by Letters Patent is:—

1. In a saw gage, substantially as described, the combination with two gage bars adapted to rest on opposite sides of a saw blade, a shoe carried by each gage bar, and a block of resilient substance resting inside each shoe; of a clamping loop having its ends connected to the gage bars and adapted to straddle a saw blade; substantially as and for the purpose set forth.

2. In a saw gage, substantially as described, the combination with two extensible gage bars adapted to rest on opposite sides of a saw blade and respectively comprising the section having a longitudinal slot, the section having a series of transverse threaded apertures and the set-screws taking through the longitudinal slot of one section and into the apertures of the other, shoes carried by each of the gage bar sections, and a block of resilient substance resting inside each shoe; of the clamping loops having their ends connected to the gage bar sections and adapted to straddle a saw blade; substantially as and for the purpose set forth.

3. In a saw gage, substantially as described, the combination with two gage bars adapted to rest upon opposite sides of a saw blade, the shoes struck up from said gage bars, and the blocks of resilient substance resting inside each shoe; of the clamping loops adapted to straddle a saw blade and having their ends pivotally connected to the gage bars; substantially as and for the purpose set forth.

In testimony whereof I affix my signature in presence of two witnesses.

CLARENCE ELIAS KING.

Witnesses:
   EMMA M. GILLETT,
   G. T. MYERS.